United States Patent
Barratt et al.

(10) Patent No.: US 12,187,527 B2
(45) Date of Patent: Jan. 7, 2025

(54) GAS STORAGE DEVICES

(71) Applicant: Simply Breathe Ltd, Beverley (GB)

(72) Inventors: Joe Michael Barratt, Beverly (GB); Matthew James Sygrove, Ogden (GB)

(73) Assignee: Simply Breathe Ltd, Flemingate Beverley (GB)

( * ) Notice: Subject to any disclaimer, the term of this patent is extended or adjusted under 35 U.S.C. 154(b) by 1378 days.

(21) Appl. No.: 16/488,622

(22) PCT Filed: Feb. 19, 2018

(86) PCT No.: PCT/GB2018/000027
§ 371 (c)(1),
(2) Date: Aug. 26, 2019

(87) PCT Pub. No.: WO2018/158553
PCT Pub. Date: Sep. 7, 2018

(65) Prior Publication Data
US 2020/0024065 A1    Jan. 23, 2020

(30) Foreign Application Priority Data
Mar. 1, 2017    (GB) ...................................... 1703286

(51) Int. Cl.
*B65D 83/00*    (2006.01)
*A62B 18/02*    (2006.01)
(Continued)

(52) U.S. Cl.
CPC ............ *B65D 83/207* (2013.01); *A62B 18/02* (2013.01); *A62B 18/10* (2013.01); *B01J 21/18* (2013.01); *B01J 23/8892* (2013.01); *B65D 83/14* (2013.01)

(58) Field of Classification Search
CPC ...... B65D 83/207; B65D 83/14; A62B 18/02; A62B 18/10; B01J 21/18; B01J 23/8892
See application file for complete search history.

(56) References Cited

U.S. PATENT DOCUMENTS

| | | | |
|---|---|---|---|
| 5,038,768 | A | 8/1991 | McGoff et al. |
| 5,685,172 | A | 11/1997 | Darredeau et al. |
| 2005/0279288 | A1 | 12/2005 | Neri |
| 2013/0211158 | A1 | 8/2013 | Romanos et al. |
| 2014/0308176 | A1 | 10/2014 | Golden et al. |

FOREIGN PATENT DOCUMENTS

| | | |
|---|---|---|
| GB | 2411812 A | 9/2005 |
| JP | S61-13097 A | 1/1986 |

(Continued)

OTHER PUBLICATIONS

Haruta et al., Preparation of Highly Active Composite Oxides of Silver for Hydrogen and Carbon Monoxide Oxidation. Studies in Surface Science and Catalysis. 1983; 16: 225-236. https://doi.org/10.1016/S0167-2991(09)60024-0.

*Primary Examiner* — Steven O Douglas
(74) *Attorney, Agent, or Firm* — Wolf, Greenfield & Sacks, P.C.

(57) ABSTRACT

The invention relates to a device (10) for dispensing oxygen (30) under pressure. The device comprises a canister (12) filled with activated carbon (14) and oxygen (30) at a pressure of between 4 and 20 barg. when measured at room temperature. The canister is sealed with a valve assembly (18) allowing release of oxygen from the canister on actuation of the valve assembly. To ensure the activated carbon does not react with the oxygen generating carbon monoxide the device further comprises a catalyst (16) that prevents or significantly reduces the presence of carbon monoxide. In a further aspect there is a device (10) for dispensing a gas (30) under pressure which device comprises a canister (12) with a volume of 11 or less filled with activated carbon (14) to adsorb the gas under a pressure of between 4 and 20 barg when measured at room temperature. The canister (12) is sealed with a valve assembly (18) crimped to the canister over a seal allowing release of the gas (30) from the canister on actuation of the valve assembly, wherein the gas is carbon dioxide, oxygen, nitrogen or air, and the canister is a steel (Continued)

canister. In a particularly favoured embodiment the device is filled with carbon dioxide and includes a high volume discharge valve making it useful as a pet behaviour correction device.

7 Claims, 1 Drawing Sheet

(51) Int. Cl.
*A62B 18/10* (2006.01)
*B01J 21/18* (2006.01)
*B01J 23/889* (2006.01)
*B65D 83/14* (2006.01)
*B65D 83/20* (2006.01)

(56) References Cited

FOREIGN PATENT DOCUMENTS

| | | |
|---|---|---|
| JP | S61-191367 A | 8/1986 |
| JP | H07-148484 A | 6/1995 |
| JP | H09-142813 A | 6/1997 |
| JP | 3087706 U | 8/2002 |
| JP | 2006-167220 A | 6/2006 |
| JP | 2009-034442 A | 2/2009 |
| JP | 2014-208340 A | 11/2014 |
| WO | WO 2005/054742 A1 | 6/2005 |
| WO | WO 2005/070788 A1 | 8/2005 |
| WO | WO 2008/064293 A2 | 5/2008 |
| WO | WO 2014/037086 A1 | 3/2014 |
| WO | WO 2017/035023 A1 | 3/2017 |

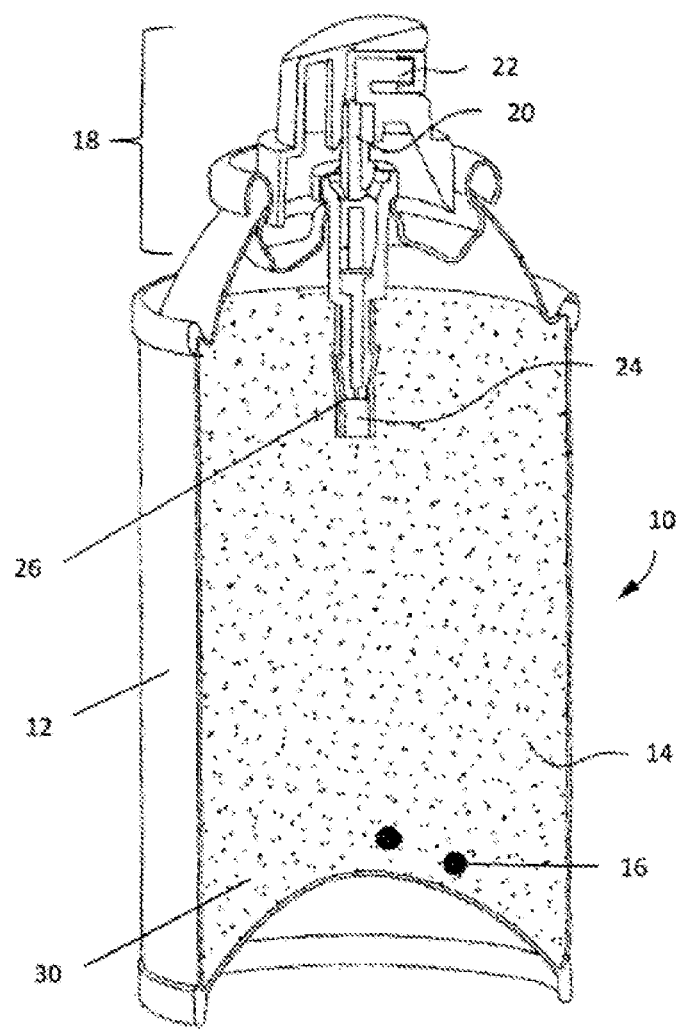

GAS STORAGE DEVICES

RELATED APPLICATION

This application is a national stage filing under 35 U.S.C. § 371 of International Application No. PCT/GB2018/000027, filed Feb. 19, 2018, the entire contents of which is incorporated by reference herein in its entirety.

This invention relates to improvements in gas storage devices and more particularly to devices filed with e.g. oxygen or carbon dioxide. It also relates to an improved method of storing gases, particularly, oxygen, carbon dioxide, nitrogen or air, in a device, and to the storage device per se.

BACKGROUND

Traditionally canisters filled with gasses are either filled with a compressed gas or utilise a propellant, such as HFA-134a, to facilitate discharge. Such systems suffer from a number of disadvantages.

By way of example, GB2411812 discloses a pet behaviour correction device comprising a canister filled with a pressurised inert condensed gas, in the form of a hydrofluorocarbon (HFC). In use the gas is discharged, towards the head of e.g. a dog, to generate a hissing sound. However, such a device has a number of limitations including: the undesirable nature of HFC's (environmental damage) giving rise to their legislative phase out, the fact that their liquid nature limits the orientation of use (they don't function effectively when inverted), and on depressurisation rapid cooling occurs, which can be distressing (and potentially harmful) for pets if activated too close to the animal, and if triggered accidentally, in e.g. a user's pocket, can give rise to freeze burns.

Alternative propellants may be used to replace HFC's but, for example, hydrocarbon gases, such as butane, are highly flammable and also suffer from volatile substance abuse potential. Many of the propellants will also leave residue deposits which in applications such as gas dusters can cause damage to sensitive electronic equipment. A gas duster is a device that is used to clean hard to reach surfaces, such as the grooves and crevices in equipment and electronic or sensitive appliances that can't be accessed or cleaned using conventional solvents.

However, because air and its components including oxygen, nitrogen and carbon dioxide are not readily liquefied, only a small quantity of gas can be stored without the need to provide reinforcement for excessively high pressure.

WO2005/054742 discloses a storage container for a gas comprising a sealed vessel containing an amount of activated carbon and a gas which is adsorbed thereon.

One such gas is oxygen.

Containers filled with compressed oxygen may be used for a range of applications, such as, for example, therapeutic or sport enhancement purposes.

The use of activated carbon as a storage means enables greater volumes of gas to be stored in a given volume. For oxygen this is about two to three times that obtained by compression alone, at the same pressure, depending upon the grade of activated carbon.

Typically the gas is stored at a pressure of from 4-17 barg (measured at room temperature), and the container typically contains at least 40%, by volume, of activated carbon. However, some canisters can withstand pressures of 20 barg.

The device may be adapted to receive a mask, mouthpiece and/or nose piece and typically comprises a valve assembly which allows filling and dispensing. It may also contain a filter between the activated carbon and a valve of the valve assembly.

The device may be connected to the mask, mouthpiece and/or nose piece via a connector, for example tubing, and these components may be sold separately or as a kit of parts.

Where the device is filled with oxygen at pressures above about 8 barg it is desirable to use a high activity carbon (one having an activity of above 60% CTC (carbon tetrachloride)), although a lower activity carbon may also be used, particularly at lower fill pressures.

Applicant has determined that devices comprising activated carbon, which are filed with oxygen or air under pressure, contain not insignificant amounts of carbon monoxide (concentrations of over 100 ppmv) as a result of a reaction between the activated carbon and oxygen. Whilst not inherently dangerous at these levels carbon monoxide has a binding affinity for haemoglobin which is 250 times greater than oxygen. In consequence even relatively low levels of carbon monoxide can negate the benefits obtained from breathing pure oxygen. Indeed at concentrations of 200 ppmv carbon monoxide can cause headache and nausea.

An aim of the present invention is to ensure that oxygen or air delivered using activated carbon is substantially free of carbon monoxide.

A second, and independent aspect, is to manage heat affects associated with the filling of canisters with a gas, which aspect is not limited to oxygen. Indeed this second aspect can be a greater problem where the gas is carbon dioxide due to the much greater volumes (as much as 25 times that of compressed carbon dioxide) that can be adsorbed in canisters filled with activated carbon, the adsorption being exothermic.

Indeed, where the gas is carbon dioxide, WO2005/054742 teaches filling the device with solid carbon dioxide or dry ice to counteract any exothermic reaction.

However, accurately dispensing dry ice proves difficult, and for a 1 l canister, a variation of as little as plus 3 g can give rise to a variance of as much as 1.6 l of carbon dioxide, which can in turn give rise to the over pressurising of the device when it equilibrates to room temperature.

Alternatively, WO2008/064293 teaches a filling methodology, which obviates the need to conduct a stepwise filling process which involves multiple cooling and recharging steps, by placing dry ice in the canister and then crimping a valve assembly to the canister.

The reason for this methodology is that devices are typically made using aluminium canisters, and a valve assembly is crimped to the canister over a plastic, such as a PET or silicon rubber, seal. Applicant has determined that due to the high thermal conductivity of aluminium, in small devices (1 l or less) the rapid transfer of heat to the canister can distort the seal causing devices to fail—leak about the crimp—hence the use of the methodology taught in WO2008/064293.

WO2005/070788 teaches filling a canister. The canister is filled with a liquid product to be dispensed via a needle inserted in to a hollow tube and operates to open the valve against the action of a biasing means in order to allow the liquid to go through the passageway and dip tube and fill the canister up to the product level.

WO2014/037086 teaches there is a need to make the filling of canisters accord with existing commercial canister production/filling techniques and apparatus in order to allow them readily to be introduced in to, and be accepted by, the aerosol industry. The arrangement disclosed is a bag-on-valve arrangement in which the bag-on-valve arrangement is inserted through the aperture and loosely held therein during a gas filling operation in which gas is fed through the aperture around a loosely positioned valve block. The gas filling is ideally effected quickly, for example in about 1 second, and the valve block is then immediately fitted tightly in the aperture and sealed therein by means of crimps/gaskets. As such, the carbon has been introduced in to the canister 1 conjoined with the bag-on-valve arrangement and held therein in a sealed condition without the need to manage or monitor its condition.

Indeed, when it comes to managing heat WO2014/037086 teaches the use of blanketing gases and keeping the carbon granules/pellets/torroids in contact with a source of carbon dioxide or other adsorbed gas, especially cold gas, liquid or snow, prior to placement in a canister.

A further and independent aim of the present invention is to find alternative methods to manage heat, or otherwise improve the manufacturing process to ensure simpler and importantly, more accurate filling, with reduced device failure, in the manufacture of activated carbon filled devices.

In contrast to the above, the applicant has determined that, at least for devices of small volume, i.e. a canister with a volume of 1 l or less, by selecting a canister of steel, as opposed to the more conventional aluminium, it is possible to fill the canister using a commercial gasser, in a single or two step process, through the device's valve assembly at pressures of at least up to 17 barg, and even to 20 barg, at room temperature. This obviates the need to either fill a part assembled device and subsequently crimp the valve assembly to the canister or to fill the device in a step wise manner, many times, cooling between each partial fill.

This has the significant advantages of:
i) Speeding the filling process; and
ii) Reducing failures due to either canister failure around the crimp, or the over pressurising of canisters.

In contrast to the teaching of WO2008/064293 the method of the second and independent aspect comprises or consists essentially of gassing a device comprising an activated carbon filled steel canister, in a single or two step process, via its valve assembly.

The gas is particularly carbon dioxide, but may be oxygen, nitrogen or air.

The device is preferably one with a canister volume of no more than 1l.

BRIEF SUMMARY OF THE DISCLOSURE

In accordance with a first aspect of the present inventions there is provided a device for dispensing oxygen under pressure comprising a canister filled with activated carbon and oxygen at a pressure of between 4 and 20 barg, when measured at room temperature, which canister is sealed with a valve assembly allowing release of oxygen from the canister on actuation of the valve assembly, characterised in that the device further comprises a catalyst that prevents or significantly reduces the presence of carbon monoxide.

Preferred catalysts convert the carbon monoxide to carbon dioxide at ambient temperature.

A preferred catalyst is Hopcalite which is a mixture of copper and manganese oxides. A variety of compositions are available including Applicants proprietary formulation SB100™.

By way of example only, Hopcalite I is a mixture of 50% MnO, 30% CuO, 15% $Co_2O_3$, and 5% $Ag_2O$ and "Hopcalite II" is approximately 3:1 manganese dioxide:copper oxide.

Preferably the Hopcalite is used at a concentration of greater than 0.4% (w/w).

Hopcalite comes in a number of forms, and a preferred form is pellets.

The activated carbon may be any carbon that has been specifically treated to develop an extensive capacity for the adsorption of a gas to be adsorbed.

Suitable carbons include carbonaceous sources such as, for example, peat, wood, coal, nutshell, petroleum, coke and bone, or synthetic sources, such as, poly(acrylonitrile) or phenol-formaldehyde.

As disclosed in WO2005/054742 (incorporated by reference), numerous methods for activation of carbon exist, and the activation process develops an intricate network of pores of various sizes ranging from macroporous (pore diameters greater than 50 nm) to sub-microporous (pore diameters less than 2 nm). The larger pores are known as transport pores and serve to provide access to the smaller pores in which most of the adsorption of gaseous species takes place.

The activated carbon may be provided in powdered, granular or pelleted forms and in a variety of sizes, both of which affect the adsorption kinetics. The skilled person will select the appropriate combination depending upon the desired material adsorption performance required.

Suitable activated carbons for use with oxygen include those of different origins, densities, activities and mesh sizes, as outlined in Example 1 of WO2005/054742, the selection being made to maximise adsorption. A preferred form is Applicants proprietary activated carbons SBC™.

Selecting an activated carbon with a high microporosity (less than 2 nm) and a high surface area (greater than 500 $m^2/g$, and more preferably greater than 1000 $m^2/g$) is clearly desirable. One such material is illustrated in Table 3 of WO2005/054742, which disclosure is incorporated by reference and the table is reproduced as Table 1 below:

TABLE 1

| Designation | SRD/347/1 |
|---|---|
| Carbon size/mm | 2 mm pellets |
| Bulk Density/g $cm^{-3}$ | 0.40 |
| CTC Sorption/% | 109 |
| OXYGEN capacity (at 12 barg) | 8.64 g/100 g |
| | 34.5 g/litre |
| BET Surface Area/$m^2$ $g^{-1}$ | 1342 |
| Total Pore Volume/$cm^3$ $g^{-1}$ | 0.850 |
| Micropore Volume/$cm^3$ $g^{-1}$ | 0.777 |
| Narrow Micropore Vol/$cm^3$ $g^{-1}$ | 0.367 |
| Broad Micropore Vol/$cm^3$ $g^{-1}$ | 0.410 |
| MERCURY POROSIMETRY | |
| Total Pore Volume/$cm^3$ $g^{-1}$ | 0.881 |
| Mesopore Volume/$cm^3$ $g^{-1}$ | 0.413 |
| Macropore Volume/$cm^3$ $g^{-1}$ | 0.468 |

NOTE:

Nitrogen Total Pore Volume 0-200 Ⓐ width.

Micropore Volume 0-20 Ⓐ width

Narrow Micro. Vol. 0-6 Ⓐ width

Broad Micro. Vol. 6-20 Ⓐ width

Mercury Total Pore Volume 20-$10^5$ Ⓐ width

Mesopore Volume 20-500 Ⓐ width

Macropore Volume 500-$10^5$ Ⓐ width

For devices filled with gases, WO2005/054742 teaches that the uptake of e.g. carbon dioxide may vary with the degree of activation (measured as the ability to adsorb carbon tetrachloride (CTC) vapour). In WO2005/054742 this is exemplified with reference to activated carbons with CTC values ranging from 27% CTC to 111% CTC in the pressure range 0-20 barg.

It is reported that at lower pressures, of under about 8 barg (FIG. 2 therein), lower activity carbon can show higher uptake, and it is further taught that the bulk density of the activated carbon appears as one of the most important factors in maximising adsorption. The teaching illustrates bulk densities in the range 0.35-0.55 g/cm$^3$.

It will be apparent from this teaching that selecting an appropriate activated carbon for a given application is something a skilled person would routinely undertake.

Having selected an appropriate activated carbon, the canister is filled with the activated carbon, which for most applications is typically by greater than 40%, through 50%, 60%, 70% and greater (by volume). There are however applications where very much smaller volumes of activated carbon may be used.

Preferably the device is also fitted with a filter, which sits between the activated carbon and the valve of the valve assembly. More preferably the filter is a HEPA filter.

Where the device is filled with oxygen or air, preferably the device is provided with a mouth and/or nose piece, facemask or the like and a connector, e.g. flexible tubing for connection to the device. An actuator allows for release of the adsorbed gas from the canister via the valve, and optionally a regulator.

Preferably the device is charged via the valve assembly, care being taken to manage the exothermic nature of the filling process. This can be effectively achieved by using a steel canister with a volume of about 1 l or less.

In accordance with a second and independent aspect of the present invention there is provided an improved method for charging a device for dispensing a gas under pressure which device comprises a canister with a volume of 1 l or less filled with activated carbon to adsorb the gas under a pressure of between 4 and 20 barg, when measured at room temperature, which canister is sealed with a valve assembly crimped to the canister over a seal allowing release of the gas from the canister on actuation of the valve assembly, wherein the gas is carbon dioxide, oxygen or air, the canister comprises steel, and the canister is filed in a single or two step operation, via the valve assembly.

Preferably the canister has a volume of 1 l or less and includes canisters of, for example, approximately 370 ml, 640 ml and 980 ml.

Such sized canisters when filled, can typically hold, respectively, approximately 10 l, 20 l and 30 l of oxygen or 40 l, 70 l or 100 l of carbon dioxide In accordance with a third aspect of the present invention there is provided a device for dispensing a gas under pressure which device comprises a canister with a volume of 1 l or less filled with activated carbon to adsorb the gas under a pressure of between 4 and 20 barg, when measured at room temperature, which canister is sealed with a valve assembly crimped to the canister over a seal allowing release of the gas from the canister on actuation of the valve assembly, wherein the gas is carbon dioxide, oxygen or air, and the canister comprises steel.

The device is preferably filled with oxygen or carbon dioxide.

Preferably the canister has a volume of 1 l or less and includes canisters of, for example, 370 ml, 640 ml and 980 ml.

A preferred device filled with carbon dioxide is a pet behaviour correction device, which device comprises a high volume discharge valve.

The high volume discharge valve has a stem with an orifice diameter of at least 0.3 mm, more preferably at least 0.4 mm, and as much as about 0.6 mm.

Another preferred device filled with carbon dioxide is a gas duster device and it comprises a tube connectable to the valve assembly to allow the gas to be directed, on discharge, to a target surface.

Preferably the canister is filled to at least 85%, more preferably at least 90%, and most preferably at least 95% by volume, with activated carbon. Were the device to be filled with dry ice sufficient space would have to be left for the dry ice such that it would not be possible to maximise the efficient filling.

Where the gas is oxygen or air the device may be provided together with one or more of a mask, mouthpiece and/or nose piece and a connector, for example tubing and these components may be sold separately or as a kit of parts.

The device or kit may be provided together with instructions for use.

In a further embodiment the device may comprise a regulator and/or a counter or other means for determining usage. The counter may be integral with the device or may communicate usage to a device carried or worn by the user, such as, for example, a smart phone or wearable device, for example, a Fit Bit®. This enables the user or a third party to monitor the effect of taking oxygen on performance and recovery.

BRIEF DESCRIPTION OF THE DRAWINGS

An embodiment of the invention is further described hereinafter with reference to the accompanying drawing, in which:

FIG. 1 is a device according to a first aspect of the invention.

DETAILED DESCRIPTION

FIG. 1 illustrates a device (10) according to a first aspect of the invention. It comprises a canister (12), preferably steel, filled with activated carbon (14) and a catalyst (16) which is sealed with a valve assembly (18) comprising a valve (20) and an actuator (22). A filter (24) prevents activated carbon clogging the valve stem (26).

The device is, according to a second aspect of the invention, filled with a gas (30), for example, oxygen, which is adsorbed into the activated carbon, and which can be subsequently released from the device by operation of the actuator (22).

To fill the device (10) gas (30) is forced into the canister (12), via valve (20), under pressure using a proprietary gasser.

The invention is further exemplified by reference to the test data generated in Examples 1 and 2.

Example 1

Effect of Catalyst on Carbon Monoxide Levels

Canisters (12) of various sizes under 1 l were assembled as set out below:

a) A pellet or two of Hopcalite (16) were added to an empty (steel) canister (12) such that the net concentration of Hopcalite was above, about, 0.5% w/w;

b) the canister (12) was filled with granular activated carbon (14), preferably using vibration to maximise the packing;

c) a filter (24) was fitted to the valve stem (26) of a valve assembly (18), and the protected valve stem (24,26) was inserted into the activated carbon (14);

d) the valve assembly (18) was crimped to the canister (12); and
e) the device (10) was gassed with a proprietary gasser using oxygen (30).

On analysis, post filling, it was noted that a small quantity of carbon monoxide appeared to form from the interaction of the oxygen, at high pressure, with the highly activated carbon surface. Tests showed that after storage for 1 month, at room temperature, the carbon monoxide concentration in the gas discharged from the device was approximately 300 ppmv, and could be as high as 600 ppmv.

This concentration, whilst not a direct hazard to health, was grossly undesirable in a product of this type, and so the Applicant undertook some further tests to see if the problem could be alleviated through the addition of a catalyst (e.g. Hopcalite).

The activated carbon precursor type was varied, as shown in Table 2, as was the amount of Hopcalite, and the amount of carbon monoxide was determined approximately 200 days post filing.

TABLE 2

| Carbon Type | Carbon Weight/g | Hopcalite Weight/g | Days after O₂ Filling | [CO]/ppm |
|---|---|---|---|---|
| Coconut Shell | 220 | 0 | 200 | 650 |
| Coconut Shell | 224 | 10 | 200 | Not Detected |
| Coal Base | 140 | 0 | 200 | 150 |
| Coal Base | 145 | 10 | 200 | Not Detected |
| Coconut Shell | 91 | 0.1 | 210 | 5 |
| Coconut Shell | 92 | 0.4 | 210 | Not Detected |
| Coconut Shell | 93 | 0.9 | 210 | Not Detected |
| Coconut Shell | 93 | 1.8 | 210 | Not Detected |

As can be seen from Table 2, the addition of Hopcalite considerably diminished the carbon monoxide concentration, and the data indicated that a concentration of >0.4 is sufficiently effective to ensure a nil concentration of carbon monoxide.

Gassing of the canisters with oxygen was undertaken using a commercial gasser operated, typically, at 10 barg.

Example 2

Effect of Canister Type on Heat Transfer and Device Failure

When a conventional canister of aluminium construction was gassed with carbon dioxide, the temperature, due to the exothermic adsorption of carbon dioxide on activated carbon, was noted to rise by 46.5° C. This rapid temperature rise caused the seal (usually rubber) between the canister and valve assembly to deform, causing leakage and premature depressurisation of the device.

In consequence, and in order to avoid over-heating and the risk of over pressurising, it was necessary to introduce the gas in a stepwise manner, allowing the device to cool between steps.

However, when a similar-sized steel canister was gassed with carbon dioxide it was noted that the temperature rise of the canister was only 3.7° C., and in consequence the applicant was able to fill the device in a single step procedure, without the risk of stressing the rubber seal or over pressurising the container.

The results of the test are given below:
Gas Used: carbon dioxide
Steel canister size: diameter 65 mm, height 195 mm. Volume=πr2h=646 ml
Aluminium canister size: diameter 66 mm, height 218 mm. Volume=πr2h=745 ml
Steel canister at room Temp: 14.5° C.
Aluminium canister: at room Temp: 14.5° C.
Carbon amount in steel canister: 265 grams
Carbon amount in aluminium canister: 282 grams
Both canisters were gassed at a pressure of 10 barg
Steel canister temperature after pressurising to 10 barg: 18.2° C.
Aluminium canister temperature after pressurising to 10 barg: 61° C.

Heat management is an important consideration in this process because too much heat generation can result in device failure due to deformation of the, typically, rubber seal provided between the canister and valve assembly, where the two components are crimped together.

Previously this has been addressed by using either solid carbon dioxide or a filling process requiring multiple, gassing steps under pressure, followed by cooling.

Preferred Activated Carbon Source.

Whilst any of these forms and derivations of activated carbon may be suitable for oxygen storage applications, it is preferred to use granular activated carbon derived from coconut shell, also known as an HDS activated carbon, since this provides excellent physical properties with low ash and is a sustainable material with environmentally friendly credentials.

The precise granulometry should be such as to give the maximum weight filling in the canister without causing difficulties in handling.

A suitable mesh range is, for example, 30×70 or 12×20 US mesh with >85 CTC activity and <5% moisture.

An appropriate, though non-limiting, density range is 0.4-0.5 g cm$^{-3}$.

The invention claimed is:

1. A device (10) for dispensing oxygen (30) under pressure comprising a canister (12) filled with at least 40% activated carbon (14), by volume, and oxygen (30) at a pressure of between 4 and 17 barg, when measured at room temperature, which canister is sealed with a valve assembly (18) allowing release of oxygen from the canister on actuation of the valve assembly, characterised in that the device further comprises a catalyst (16) that prevents or significantly reduces the presence of carbon monoxide.

2. The device as claimed in claim 1, wherein the catalyst is one which converts carbon monoxide to carbon dioxide at ambient temperature.

3. The device as claimed in claim 2, wherein the catalyst comprises manganese dioxide and copper oxide.

4. The device as claimed in claim 3, wherein the catalyst is Hopcalite.

5. The device as claimed in claim 1, wherein the activated carbon is derived from coconut shell or a coal base.

6. The device as claimed in claim 1, wherein the activated carbon has a density of from 0.4-0.5 g cm$^{-3}$.

7. A kit comprising the device as claimed in claim 1.

* * * * *